No. 669,873. Patented Mar. 12, 1901.
T. BELL.
GOLD SAVING MACHINE.
(Application filed Oct. 19, 1900.)
(No Model.) 2 Sheets—Sheet 1.

WITNESSES:

INVENTOR
Thomas Bell
BY
Fred J. Dieterich
ATTORNEY

No. 669,873. Patented Mar. 12, 1901.
T. BELL.
GOLD SAVING MACHINE.
(Application filed Oct. 19, 1900.)
(No Model.) 2 Sheets—Sheet 2.

WITNESSES:
A. P. Dieterich
Louis Dieterich

INVENTOR
Thomas Bell
BY
Fred G. Dieterich
ATTORNEY

UNITED STATES PATENT OFFICE.

THOMAS BELL, OF VANCOUVER, CANADA.

GOLD-SAVING MACHINE.

SPECIFICATION forming part of Letters Patent No. 669,873, dated March 12, 1901.

Application filed October 19, 1900. Serial No. 33,594. (No model.)

*To all whom it may concern:*

Be it known that I, THOMAS BELL, a citizen of the Dominion of Canada, residing at Vancouver, in the Province of British Columbia, Canada, have invented a new and useful Gold-Saving Machine, of which the following is a specification.

My invention relates to improvements in that class of machines where the auriferous sand having first been separated from the coarser gravel by passing over "grizzlies" is passed over a surface amalgamated with quicksilver to arrest and retain the fine gold which is left in the sand. I attain this object by the means illustrated in the accompanying drawings, in which—

Figure 1:
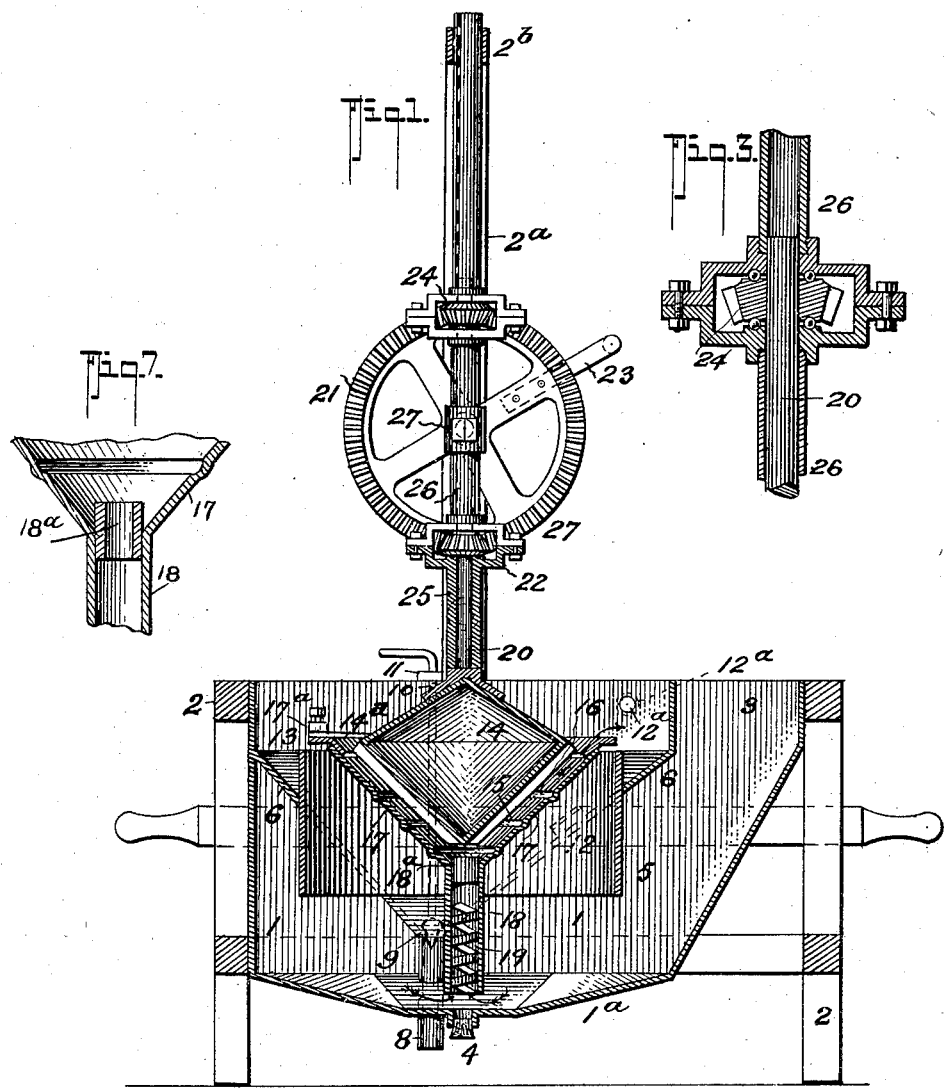
Figure 2:
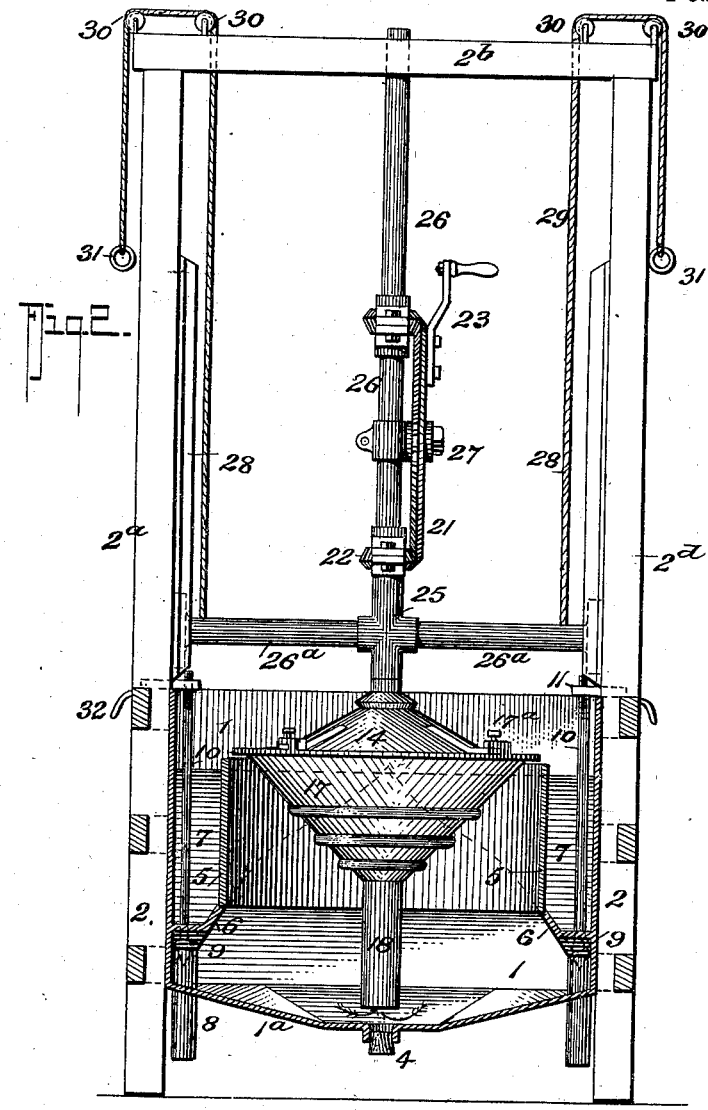
Figure 3:
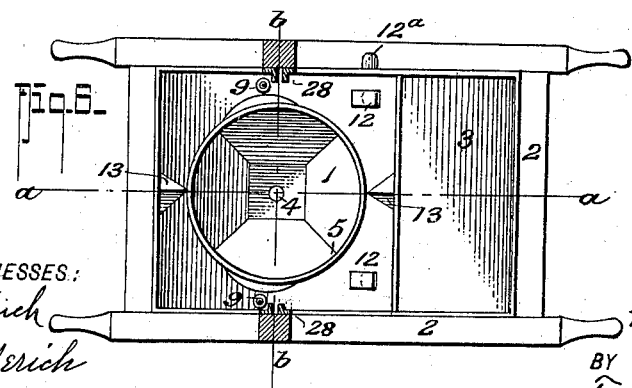

Figure 1 is a vertical longitudinal section on the line $a\,a$ in Fig. 6. Fig. 2 is a vertical cross-section and part elevation on the line $b\,b$ in Fig. 6. Fig. 3 is a detail of a bevel-pinion and its support. Fig. 4 is an inverted plan of the conical vessel, showing its vanes. Fig. 5 is a detail of the means by which the outer amalgamated cone is attached to the conical vessel. Fig. 6 is a plan of the machine to a smaller scale, with the rotating cones and the driving mechanism removed; and Fig. 7 is a detail view illustrating the correlation of the removable tube $18^a$, the suction-pipe 18, and the lower end of the conical plate 17, hereinafter specified.

The machine consists of an oblong tank or receptacle 1, preferably made of light galvanized iron, supported by a light wooden framework 2. Across one end of this tank is the inlet 3, and the bottom $1^a$ is sloped from the sides to the center, where there is a plugged outlet 4 for emptying the tank when desired. In the center of the tank 1 is a cylindrical partition 5, which is supported by and fixed to division-plates 6, which form hopper-like receptacles 7 on each side of the cylindrical division 5 and have openings in their lowest parts with outlet-pipes 8, which pass through the bottom of the tank 1 and discharge into the tailings-flume. These outlets 8 are closable with conical valves 9, actuated by the stems 10, the upper ends of which are threaded through the supports 11, attached to the side frames of the machine, and are provided with handles.

In the division-plate 6 are openings 12 to allow the water to pass from 1 to 7, and these openings are provided with hoods to prevent the "dirt" from passing back from 7 to 1. An overflow $12^a$ is provided to maintain a constant level of water in the tank. 13 indicates gusset-pieces to prevent the tailings from lodging on the flatter portions of the junction of the cylinder 5 and the division-plate 6.

In the center of the cylinder 5 is a revoluble hollow air-tight vessel 14, to the under conical surface of which are fixed blades or projections 15, and removably attached to this vessel 14, so as to retain an annular passage 16, is a conical plate 17, the inner surface of which is provided with circumferential grooves and is amalgamated with quicksilver. I attach 17 to 14 by means of the wing-pieces $14^a$ and the clips and screws $17^a$, (see Fig. 5,) the clips being part of the strengthening-ring around the larger diameter of 17. The smaller diameter of the conical plate 17 is continued into the suction-pipe 18, which terminates close to the bottom $1^a$ of the tank. In the neck or junction of 17 to 18 is a removable piece of tube $18^a$, which projects into the cone, as shown, and forms an annular pocket to retain any gold which may fall back from the surface of 17 on stopping the machine. In the lower part of 18 is fixed a spiral or coil 19, which serves to assist the conveyance of the dirt up the pipe and also prevents the tube becoming packed or choked.

The conical vessel 14 and its attached amalgamated cone and suction-pipe are rotated by means of the attached vertical spindle 20, motion being imparted by means of the bevel-wheel 21 and pinion 22 from the crank-handle 23, attached to the back of the bevel-wheel 21.

The bevel-pinion 24 is merely an idler running free on the prolongation of the spindle 20, to which 22 is keyed. This shaft 20 runs on the bearing 25, which forms part of the framework 26, carrying the gearing. This framework I preferably make of tubing to combine lightness with strength. The wheel 21 runs on a stud-bearing 27, clamped onto the hollow-tube gear-frame. The faces of the pinions run on balls to reduce friction in the manner illustrated in Fig. 3.

The frame 26 is carried out laterally by the cross-arms $26^a$, which have T-shaped ends to slide in the angle-iron guides 28, attached to the upright posts 2ª, which have a cross-timber 2ᵇ, through which the vertical member of the frame 26 slides.

The whole gear-frame and its attached amalgamator and suction-pipe are thus capable of being elevated by means of the cords 29 passing over the small pulleys 30, and the rings 31 being passed onto the hooks 32 the amalgamator can be removed for examination or renewal.

In the operation of my machine the dirt is first passed through the sluice-boxes to catch any heavy gold it may contain and thereafter over a three-screen grizzly, which rejects the larger gravels and allows only the finer sand and water to pass through the inlet 3 to my machine. When the tank is full, the buoyancy of the vessel 14 just about balances the weight of it and its attached mechanism. It is then rotated by means of the crank-handle 23, and the centrifugal force of the water in the passage 16, carried around by the blades 15, induces a flow up the suction-pipe 18, which is assisted by the spiral 19, and the gold-carrying sand is drawn up with the water, and as it passes through 16 the gold, being heavier than the water and sand, clings to the surface of 17 and is retained in the riffles and on the amalgamated surface thereof, while the sand and water are discharged at the periphery and find their way down the sloping sides to the outlet-pipes 8 and thence to the tailings-flume. As before explained, the annular pocket formed by 18ª retains any gold which on stopping the machine would otherwise fall back into the tank.

Having now particularly described my invention and in what manner the same is to be used, what I claim as new, and desire to be protected in by Letters Patent of the United States, is—

1. In a machine for the saving of fine gold from sand or pulp; a tank having a bottom sloping slightly down from each side toward the center; a V-shaped partition in such tank dividing it horizontally into two parts, an upper and a lower; a cylindrical opening in the center of such partition the cylinder of which forms an inner wall to the V-partition; a conical amalgamator adapted to float within the cylinder on the water in the tank, and adapted to rotate therein on a vertical axis, means carried by said conical amalgamator by which the water and pulp are conveyed from the lower to the upper division of the tank; and means whereby the water and sand are introduced to the lower and the tailings withdrawn from the upper divisions, substantially as described.

2. In a machine of the class described, a tank of suitable form having a V-shaped partition and a cylindrical opening therein; an inlet whereby the sand and water are admitted to the lower division of the tank; outlets in the lower parts of the upper division, whereby the tailings may escape; valves controlling such outlets; a buoyant vessel adapted to rotate on a vertical axis within the cylindrical opening and having a conical under side with projections or vanes thereon; a conical plate having its inner surface amalgamated attached to the conical under side of the buoyant rotatable vessel, with an intervening annular space, and to the smaller diameter of which is attached a suction-pipe leading nearly to the bottom of the lower division of the tank; an internal removable sleeve at the junction of the conical amalgamator and the suction-pipe, and projecting within the cone so as to leave an annular ring or pocket; a coil or spiral within the lower part of the suction-pipe adapted to assist the conveyance of the pulp up through the amalgamator, all substantially as described.

3. In a machine of the class described, a tank of suitable form; a V-shaped partition in such tank dividing it into an upper and lower division; a cylindrical opening in such partition; means whereby the pulp and water may be admitted to the lower compartment and the tailings withdrawn from the upper compartment; a conical amalgamator attached to a buoyant vessel rotatable in the cylindrical opening; and means whereby the pulp and water are induced to flow through the space between the buoyant vessel and the conical amalgamator; a vertical spindle attached to such buoyant vessel; and means whereby such spindle is rotated; a framework carrying the bearings and driving mechanism, slidable vertically in guides in a frame attached to the tank of the machine and means whereby the amalgamator and its mechanism may be raised out of the tank for examination or removal, all substantially as described.

In testimony whereof I have signed my name to this specification in the presence of two subscribing witnesses.

THOMAS BELL.

Witnesses:
W. G. TRETHEWEY,
ROWLAND BRITTAIN.